United States Patent
Adams et al.

(10) Patent No.: US 9,262,616 B2
(45) Date of Patent: *Feb. 16, 2016

(54) SIMPLIFIED MULTI-FACTOR AUTHENTICATION

(71) Applicant: BlackBerry Limited, Waterloo (CA)

(72) Inventors: Neil Patrick Adams, Waterloo (CA); Richard Paul Sibley, Kitchener (CA); Dinah Lea Marie Davis, Waterloo (CA); Ravi Singh, Mississauga (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/446,452

(22) Filed: Jul. 30, 2014

(65) Prior Publication Data

US 2014/0337636 A1 Nov. 13, 2014

Related U.S. Application Data

(63) Continuation of application No. 13/738,456, filed on Jan. 10, 2013, now Pat. No. 8,812,864, which is a continuation of application No. 12/325,602, filed on Dec. 1, 2008, now Pat. No. 8,370,640.

(51) Int. Cl.

| G06F 21/00 | (2013.01) |
| G06F 21/32 | (2013.01) |
| G06F 21/34 | (2013.01) |
| H04L 9/32  | (2006.01) |

(Continued)

(52) U.S. Cl.
CPC ............... *G06F 21/32* (2013.01); *G06F 21/34* (2013.01); *G06F 21/35* (2013.01); *H04L 9/3231* (2013.01); *H04L 9/3271* (2013.01); *H04W 12/06* (2013.01); *H04L 2209/80* (2013.01)

(58) Field of Classification Search
CPC ......... G06F 21/30–21/34; H04L 9/32–9/3234; H04L 9/3271
USPC .................. 713/186; 340/5.61; 235/380, 441; 382/115
See application file for complete search history.

(56) References Cited

U.S. PATENT DOCUMENTS

| 5,493,621 A | 2/1996 | Matsumura |
| 5,712,912 A | 1/1998 | Tomko et al. |
| 5,768,382 A | 6/1998 | Schneier et al. |

(Continued)

FOREIGN PATENT DOCUMENTS

| WO | 9926372   | 5/1999  |
| WO | 02078249  | 10/2002 |
| WO | 2006102625 | 9/2006  |

OTHER PUBLICATIONS

Extended European Search Report, Application No. 08170407.4, dated Apr. 1, 2009.

*Primary Examiner* — Brian Shaw
(74) *Attorney, Agent, or Firm* — Ridout & Maybee LLP

(57) ABSTRACT

A reader element is associated with an identity verification element. The reader element has a biometric input device and is configured, through enrollment of a biometric element is used to encrypt a character sequence associated with the identity verification element. In a verification phase subsequent to the enrollment, a user may be spared a step of providing the character sequence by, instead, providing the biometric element. Responsive to receiving the biometric element, the reader element may decrypt the character sequence and provide the character sequence to the identity verification element.

17 Claims, 9 Drawing Sheets

(51) Int. Cl.
*G06F 21/35* (2013.01)
*H04W 12/06* (2009.01)

(56) References Cited

U.S. PATENT DOCUMENTS

| | | |
|---|---|---|
| 5,799,098 A | 8/1998 | Ort et al. |
| 5,841,865 A | 11/1998 | Sudia |
| 6,325,285 B1 | 12/2001 | Baratelli |
| 6,327,376 B1 | 12/2001 | Harkin |
| 7,711,152 B1 | 5/2010 | Davida et al. |
| 7,962,754 B2 | 6/2011 | Fujii et al. |
| 8,055,906 B2 | 11/2011 | Abdallah et al. |
| 8,370,640 B2 | 2/2013 | Adams et al. |
| 8,812,864 B2 | 8/2014 | Adams et al. |
| 2002/0027992 A1 | 3/2002 | Matsuyama et al. |
| 2002/0188855 A1 | 12/2002 | Nakayama et al. |
| 2003/0014372 A1 | 1/2003 | Wheeler et al. |
| 2003/0163686 A1 | 8/2003 | Ward et al. |
| 2004/0014423 A1 | 1/2004 | Croome et al. |
| 2004/0015704 A1 | 1/2004 | De Schrijver |
| 2004/0078066 A1 | 4/2004 | Ohta et al. |
| 2005/0086497 A1 | 4/2005 | Nakayama |
| 2005/0160042 A1 | 7/2005 | Russell et al. |
| 2005/0235148 A1 | 10/2005 | Scheidt et al. |
| 2006/0219776 A1 | 10/2006 | Finn |
| 2006/0226951 A1 | 10/2006 | Aull et al. |
| 2007/0011466 A1 | 1/2007 | Imura |
| 2007/0014407 A1 | 1/2007 | Narendra et al. |
| 2007/0040017 A1 | 2/2007 | Kozlay |
| 2007/0118758 A1 | 5/2007 | Takahashi et al. |
| 2008/0040593 A1 | 2/2008 | Kaabouch et al. |
| 2008/0072063 A1 | 3/2008 | Takahashi et al. |
| 2008/0319915 A1 | 12/2008 | Russell et al. |
| 2009/0070583 A1 | 3/2009 | von Mueller et al. |
| 2010/0287369 A1 | 11/2010 | Monden |

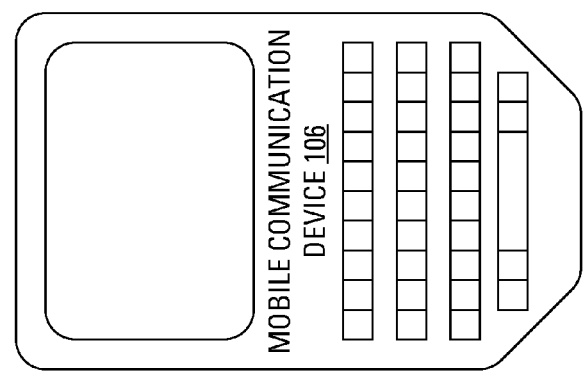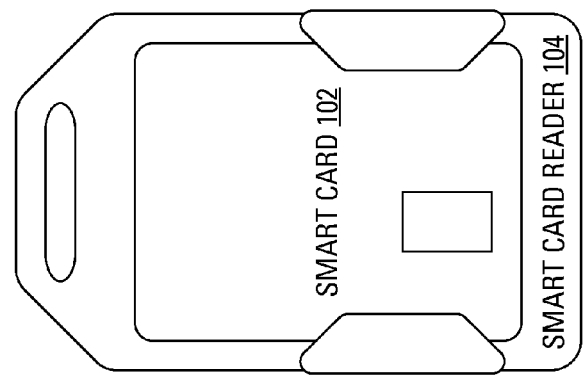
FIG. 1

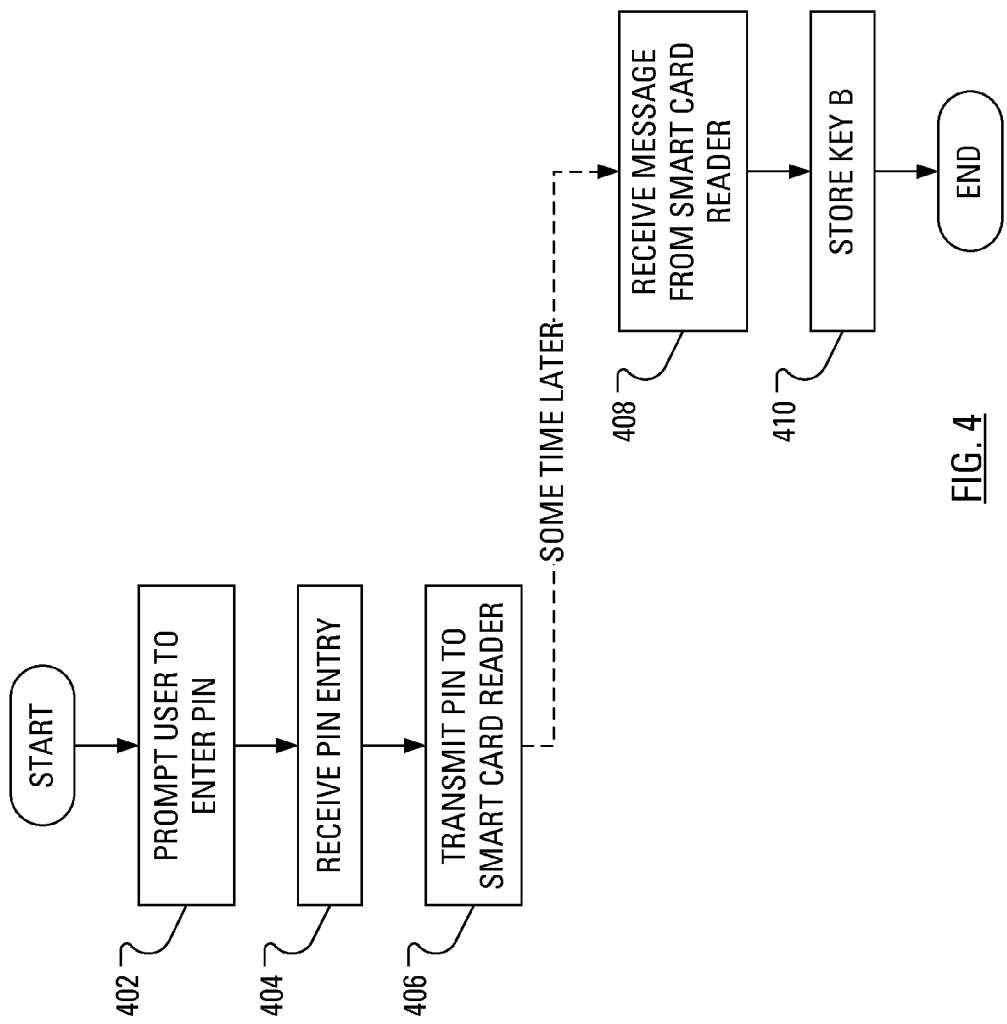

SIMPLIFIED MULTI-FACTOR AUTHENTICATION

CROSS-REFERENCE TO RELATED APPLICATIONS

The present application is a continuation of U.S. patent application Ser. No. 13/738,456, filed Jan. 10, 2013. U.S. patent application Ser. No. 13/738,456 is a continuation of U.S. patent application Ser. No. 12/325,602, filed Dec. 1, 2008, and issued as U.S. Pat. No. 8,370,640. The contents of both documents are hereby incorporated herein by reference.

FIELD

The present application relates generally to device security and, more specifically, to providing for multi-factor authentication through the use of biometric information.

BACKGROUND

Before using a secure device, a user is often required to enter a character sequence known as a Personal Identification Number (PIN) to unlock the secure device. Some secure devices are produced without keypads on which a PIN may otherwise be entered. Accordingly, the user generally enters the PIN using a primary device (e.g., a mobile phone, a portable digital assistant, a personal computer) that is in communication with the secure device. Subsequent to a candidate PIN being entered on the primary device, the candidate PIN is transmitted between several different software and hardware components of the primary device. For example, the candidate PIN may be transmitted from a user interface (UI) component that has received the candidate PIN to an application that caused the UI component to be presented to the user. Furthermore, the UI component may transmit the candidate PIN to a kernel and the kernel may transmit the candidate PIN to the secure device via several more components. In some cases, the candidate PIN may be transmitted to the secure device as clear text; in other cases, the candidate PIN may be transmitted to the secure device in an encrypted form. An attacker, therefore, has multiple opportunities to intercept a transmission of the candidate PIN from component to component between the time at which the user enters the candidate PIN on the primary device and the time at which the candidate PIN is transmitted by the primary device to the secure device.

BRIEF DESCRIPTION OF THE DRAWINGS

Reference will now be made to the drawings, which show by way of example, embodiments of the present disclosure, and in which:

FIG. 1 illustrates an environment in which a smart card is illustrated along with a mobile communication device that communicates wirelessly with a smart card reader;

FIG. 4 illustrates example steps in a method carried out by the mobile communication device of FIG. 1 in an enrollment phase;

DETAILED DESCRIPTION OF THE EMBODIMENTS

A reader element is associated with an identity verification element. The reader element has a biometric input device and is configured, through enrollment of a biometric element, to encrypt a character sequence associated with the identity verification element. In a verification phase subsequent to the enrollment, a user may be spared a step of providing the character sequence by, instead, providing the biometric element. Responsive to receiving the biometric element, the reader element may decrypt the character sequence and provide the character sequence to the identity verification element.

According to one aspect described herein, there is provided a method of handling a factor of a multi-factor authentication sequence. The method may comprise receiving a biometric candidate, generating a cryptographic key from the biometric candidate and decrypting a previously stored, encrypted character sequence associated with an identity verification element, wherein the decrypting employs the cryptographic key and results in a decrypted character sequence. The method further includes transmitting the decrypted character sequence to the identity verification element, receiving, from the identity verification element, an indication of character sequence verification, determining, from the indication, that the identity verification element has verified the decrypted character sequence and, responsive to the determining, proceeding with the multi-factor authentication sequence. In other aspects of the present application, an apparatus is provided for carrying out this method and a computer readable medium is provided for adapting a processor to carry out this method.

Other aspects and features of the present disclosure will become apparent to those of ordinary skill in the art upon review of the following description of specific embodiments of the disclosure in conjunction with the accompanying figures.

FIG. 1 illustrates an exemplary communication system 100 that includes a mobile communication device 106 that is enabled to communicate wirelessly with a peripheral device in the form of a smart card reader 104. A smart card 102 is illustrated mounted in the smart card reader 104. The smart card 102 may be considered to be an embodiment of an element that may, more generically, be known as an identity verification element.

Figure 2:
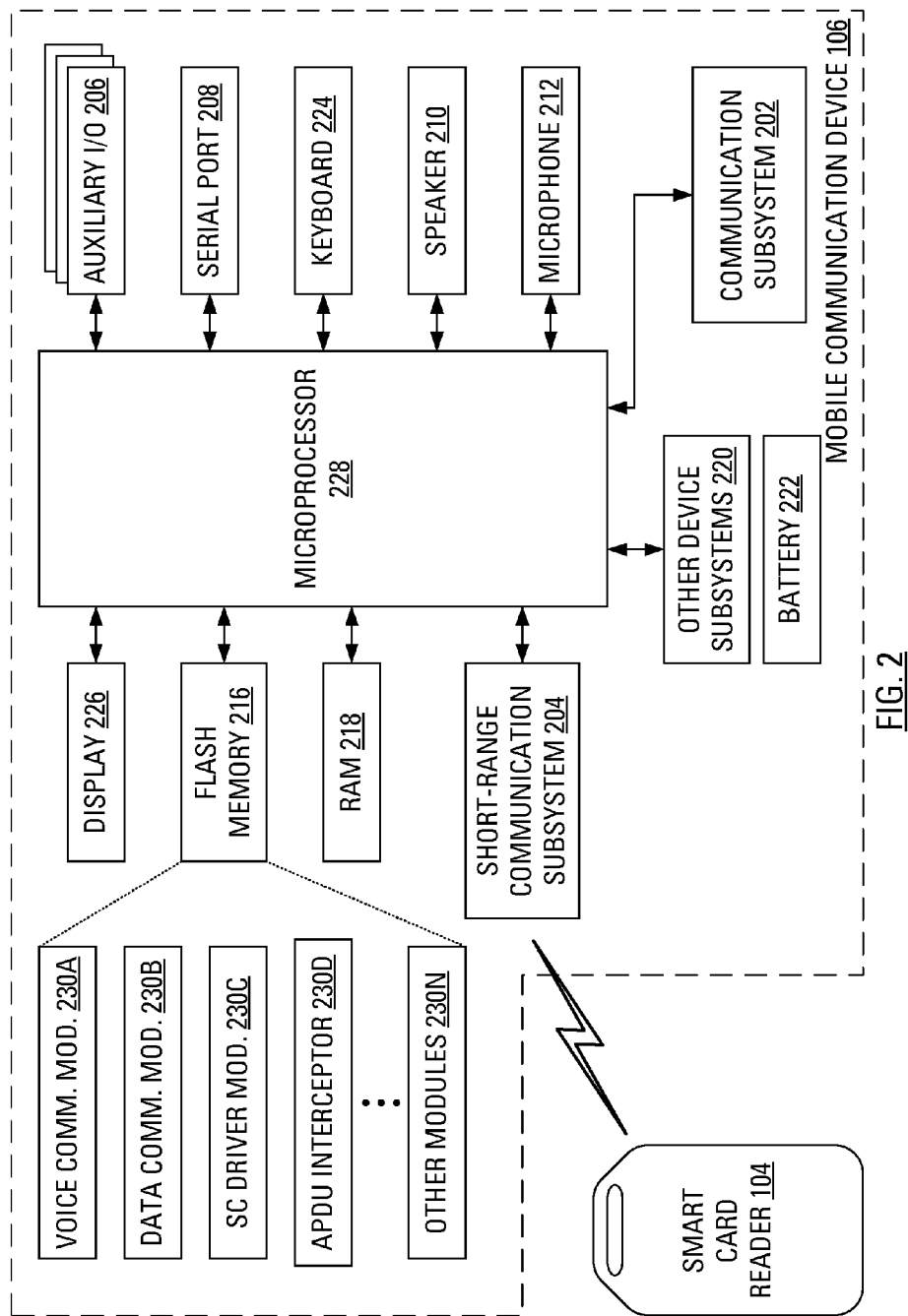
FIG. 2 schematically illustrates the mobile communication device of FIG. 1.

FIG. 2 illustrates the mobile communication device 106 including a housing, an input device (e.g., a keyboard 224 having a plurality of keys) and an output device (e.g., a display 226), which may be a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile communication device 106, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the mobile communication device 106 are shown schematically in FIG. 2. These may include a communications subsystem 202, a short-range communications subsystem 204, the keyboard 224 and the display 226. The mobile communication device 106 may further include other input/output devices such as a set of auxiliary I/O devices 206, a serial port 208, a speaker 210 and a microphone 212. The mobile communication device 106 may further include memory devices including a flash memory 216 and a Random Access Memory (RAM) 218. Furthermore, the mobile communication device 106 may include various other device subsystems 220. The mobile communication device 106 may have a battery 222 to power the active elements of the mobile communication device 106. The mobile communication device 106 may, for instance, comprise a two-way radio frequency (RF) communication device having voice and data communication capabilities. In addition, the mobile communication device 106 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile communication device 106. A predetermined set of software applications that control basic device operations, such as a voice communications module 230A and a data communications module 230B, may be installed on the mobile communication device 106 during manufacture. A smart card (SC) driver module 230C may also be installed on the mobile communication device 106 during manufacture. Furthermore, a command APDU interceptor 230D may also be installed on the mobile communication device 106 to implement aspects of the present disclosure. As well, additional software modules, illustrated as another software module 230N, which may be, for instance, a personal information manager (PIM) application, may be installed during manufacture. The PIM application may be capable of organizing and managing data items, such as e-mail messages, calendar events, voice mail messages, appointments, and task items. The PIM application may also be capable of sending and receiving data items via a wireless carrier network. The data items managed by the PIM application may be seamlessly integrated, synchronized and updated via the wireless carrier network with the device user's corresponding data items stored or associated with a host computer system.

Communication functions, including data and voice communications, may be performed through the communication subsystem 202 and through the short-range communications subsystem 204.

The short-range communications subsystem 204 enables communication between the mobile communication device 106 and other proximate systems or devices, which need not necessarily be similar devices. For example, the short-range communications subsystem 204 may include a Bluetooth™ communication module to provide for communication with the smart card reader 104 where the smart card reader also implements a Bluetooth™ communication module. As another example, the short-range communications subsystem 204 may include an infrared device to provide for communication with similarly-enabled systems and devices.

Figure 3:
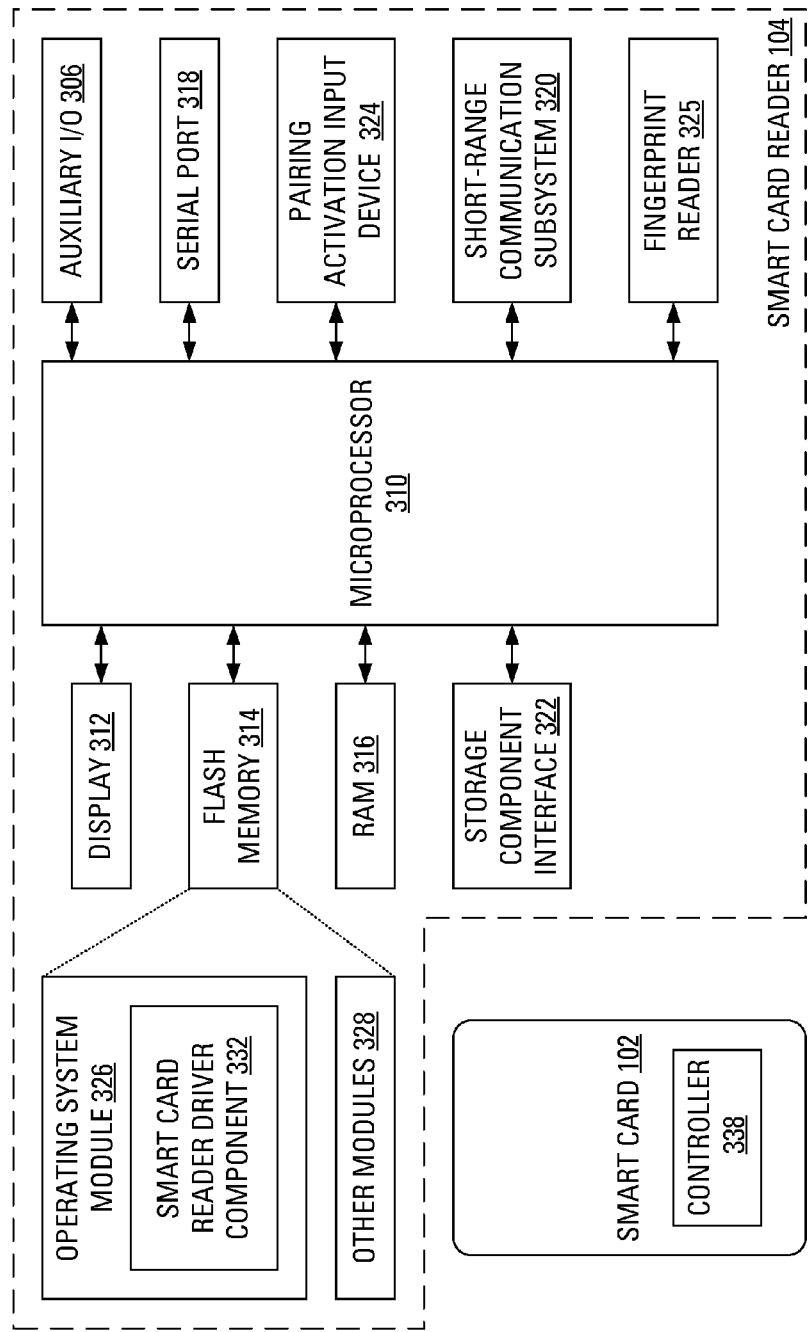
FIG. 3 schematically illustrates the smart card reader of FIG. 1.

FIG. 3 illustrates an example embodiment of the smart card reader 104. The smart card reader 104 includes a controller including at least one smart card reader microprocessor 310, which is suitably programmed to control the overall operation and functions of the smart card reader 104. The smart card reader 104 may also include an output device (e.g., a display module 312). The smart card reader 104 may further include peripheral devices or subsystems such as a flash memory 314, a RAM 316, a serial port 318 (e.g., a Universal Serial Bus, or "USB", port), a smart card reader short-range communications subsystem 320 (e.g., an infrared transceiver, wireless bus protocol system using a protocol such as a Bluetooth™), a storage component interface 322 (e.g., for a memory card or any other data storage device), a pairing-activation input device 324 (e.g., a push button) and a biometric information input device 325 (e.g., a fingerprint sensor). In some embodiments, the RAM 316 includes a portion allocated to a data cache.

The smart card reader microprocessor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software application modules indicated generally by reference 328. The operating system module 326 of the smart card reader 104 further includes a smart card reader driver component 332.

The smart card reader driver component 332 is responsible for coordinating communications between the smart card reader 104 and the smart card 102 and/or the smart card driver module 230C of the mobile communication device 106. Based on results of various communications with the smart card reader 104, the smart card driver module 230C maintains a record of the state of the smart card 102. The operating system module code 326, code for specific device application modules 328, code for the smart card reader driver component 332, or code components thereof, may be temporarily loaded into a volatile storage medium such as the RAM 316. Received communication signals and other data may also be stored in the RAM 316. Additionally, the storage component interface 322 receives the smart card 102, which may provide additional storage space for the smart card reader 104.

In one embodiment, the smart card 102 has a controller 338 responsible for coordinating communications between the smart card 102 and the smart card reader driver component 332 of the smart card reader 104.

The stored program control (i.e., software application modules 328) for the smart card reader microprocessor 310 may include a predetermined set of applications, code components or software modules that control basic device operations, for example, management and security related control of the data of the smart card reader 104, and may be installed on the smart card reader 104 as a component of the software application modules 328 during the manufacturing process. Further applications may also be loaded (i.e., downloaded) onto the smart card reader 104 through the operation of the serial port 318, the smart card reader short-range communications subsystem 320 or from the smart card 102. The downloaded code modules or components may then be installed by the user (or automatically) in the RAM 316 or non-volatile program memory (e.g., the flash memory 314).

While the smart card reader driver component 332 is shown to be an integrated portion of the operating system 326 for security purposes (e.g., individuals are not permitted to tamper with the smart card reader driver component 332), the smart card reader driver component 332 may be installed as one of the software applications 328, so long as suitable security related precautions are taken to ensure that the smart card reader driver component 332 cannot be modified or tampered with by unauthorized users.

The serial port 318 may be a USB-type interface port for interfacing or synchronizing with another device, such as a personal computer or the mobile communication device 106. The serial port 318 is used to set preferences through an external device or software application or exchange data with a device, such as the mobile communication device 106. Such data may be stored on the smart card 120 that is plugged into the storage component interface 322 of the smart card reader 104. The serial port 318 is also used to extend the capabilities of the smart card reader 104 by providing for downloads, to the smart card reader 104, of information or software, including user interface information.

The short-range communications subsystem 320 provides an interface for communication between the mobile communication device 106 or personal computer and the smart card reader 104. In one embodiment, the short-range communications subsystem 320 employs an infrared communication link or channel. In another embodiment, the short-range communications subsystem 320 operates according to a wireless RF bus protocol, such as Bluetooth™. However, the short-range communications subsystem 320 may operate according to any suitable local wired or wireless communication protocol, so long as the short-range communications subsystem 204 (FIG. 2) of the mobile communication device 106 operates using the same protocol, thereby facilitating wireless communication between the mobile communication device 106 and the smart card reader 104. Any communications mechanism and/or protocol may be implemented for the short-range communications subsystems 204, 320, so long as the mobile communication device 106 can communicate with the smart card reader 104 when the mobile communication device 106 is no more than a predetermined distance away from the smart card reader 104.

In one embodiment, the smart card 102 may be compliant with a Federal Information Processing Standards Publication (FIPS) standard. For example, FIPS 201 is a United States federal government standard that specifies Personal Identity Verification (PIV) requirements for Federal employees and contractors. It is forecast that Personal Identity Verification (PIV) Cards will be deployed to all US government employees (in the millions) over the next few years.

PIV cards store biometric templates (e.g., fingerprint templates). Access to the biometric templates on a given PIV card (i.e., a smart card) is protected by a PIN. A PIV card PIN is typically a sequence eight characters in length, with only digits 0, 1, 2, 3, 4, 5, 6, 7, 8 and 9 being valid characters. In other embodiments, the PIN may comprise a sequence of any plural number of characters.

Often, before the smart card 102 can be used, the user of the smart card is required to be authenticated as having permission to use the smart card 102 or to extract some data stored on the smart card 102. One manner in which such permission is determined is through an association of a PIN with the smart card 102. When the smart card 102 is assigned to a user, the smart card PIN is revealed to the user. Then, before the user can use the smart card 102, the user is required to provide the PIN for verification by the smart card 102.

Typically, in the situation illustrated in FIG. 1 wherein the smart card 102 is received within the smart card reader 104 and the smart card reader 104 is in communication (wired or wireless) with the mobile communication device 106, user authentication is accomplished via a user authentication application executed on the mobile communication device 106.

The smart card 102 may, for example, store a private cryptographic key that is to only be associated with the user. In a situation wherein the user requires use of the private cryptographic key that is stored on the smart card 102, use of the private cryptographic key may be gained after the PIN associated with the smart card 102 has been correctly provided. Access to the mobile communication device 106 may be gained by satisfying a three factor authentication process. In one example, the three factors include: "Something the user is", e.g., the user's fingerprint; "Something the user has", e.g., the smart card 102; and "Something the user knows", e.g., the PIN associated with the smart card 102.

While using the mobile communication device 106, the user may elect to electronically sign a recently composed e-mail message before sending the message. The user may interact with a message composition user interface (UI) to indicate a desire to electronically sign the message. Responsive to the user's so indicating, the microprocessor 228 of the mobile communication device 106 may generate a hash of the message and arrange for transmission of the hash, along with a request for an electronic signature, to the smart card reader 104. Responsive to receiving the signature request, the smart card 102 may generate a request for the smart card PIN. The PIN request may be sent by the smart card reader 104 to the mobile communication device 106.

Upon receipt of the PIN request, the user authentication application controls presentation of a UI to the user on the display 226 of the mobile communication device 106 and the user employs the keyboard 224 to provide a candidate PIN to the mobile communication device 106. The mobile communication device 106 communicates the candidate PIN to the smart card reader 104. The smart card reader 104 communicates the candidate PIN to the smart card 102.

If the smart card 102 determines that the candidate PIN is correct, the smart card 102 may generate an electronic signature from the hash received in the signature request and transmit the electronic signature to the smart card reader 104, which transmits the electronic signature to the mobile communication device 106 for transmission in conjunction with transmission of the message.

If the smart card 102 determines that the candidate PIN is incorrect, the smart card 102 may indicate authentication failure to the smart card reader 104. The smart card reader 104 may then communicate an indication of authentication failure to the mobile communication device 106. The mobile communication device 106 may then indicate authentication failure to the user via the application UI. The smart card reader 104 may also provide an indication of authentication failure directly to the user on the display module 312 of the smart card reader 104.

In the scenario presented above, subsequent to a candidate PIN being entered by the user on the keyboard 224 of the mobile communication device 106, the candidate PIN may be transmitted between several different software and hardware components of the mobile communication device 106. For example, the candidate PIN may be transmitted from a UI component that has received the candidate PIN to the application that caused the UI component to be presented to the user. Furthermore, the UI component may transmit the candidate PIN to a kernel, and the kernel may transmit the candidate PIN to the smart card reader 104 via several more components. In some cases, the candidate PIN may be transmitted, by the mobile communication device 106, to the smart card reader 104 as clear text; in other cases, the candidate PIN may be transmitted, by the mobile communication device 106, to the smart card reader 104 in an encrypted form. An attacker, therefore, has multiple opportunities to intercept a transmission of the candidate PIN from component to component between the time at which the user enters the candidate PIN on the mobile communication device 106 and the time at which the candidate PIN is transmitted by the smart card reader 104 to the smart card 102.

In overview, the smart card reader 104 may be configured to store an encrypted version of the PIN associated with the smart card 102. The user may then use a fingerprint entry to trigger the smart card reader 104 to decrypt the smart card PIN and transmit the PIN to the smart card 102. Since a candidate PIN is not entered on the mobile communication device 106 by the hand of the user and the candidate PIN is not transmitted to the smart card reader 104 at the time of unlocking the smart card 102, the number of opportunities for an attacker to intercept transmission of the candidate PIN is significantly reduced.

In connection with setting up or configuring Multi-Factor Authentication, the user may interact with a menu UI on the mobile communication device 106 to indicate a desire to use "Simplified Three Factor Authentication", thereby causing the microprocessor 228 of the mobile communication device 106 to execute an authentication application.

In operation, in an enrollment phase illustrated in FIG. 4, the authentication application executed on the mobile communication device 106 prompts (step 402) the user to enter the smart card PIN. Responsively, the user may enter the smart card PIN using the keyboard 224 of the mobile communication device 106. Accordingly, the authentication application receives (step 404) the smart card PIN and transmits (step 406) the smart card PIN to the smart card reader 104.

Alternatively, and for increased security, the user may elect to use biometric PIN entry to enter the smart card PIN directly on the smart card reader 104. Biometric PIN entry is a scheme that involves a predetermined assignment of characters to biometric templates so that the user can enter a character sequence on the smart card reader 104 by providing a sequence of biometric inputs to biometric input device. Biometric PIN entry is a subject of a commonly owned, concurrently filed patent application (Ser. No. 12/325,623 titled "Simplified Biometric Character Sequence Entry", the contents of which are hereby incorporated herein by reference.

Figure 5A:
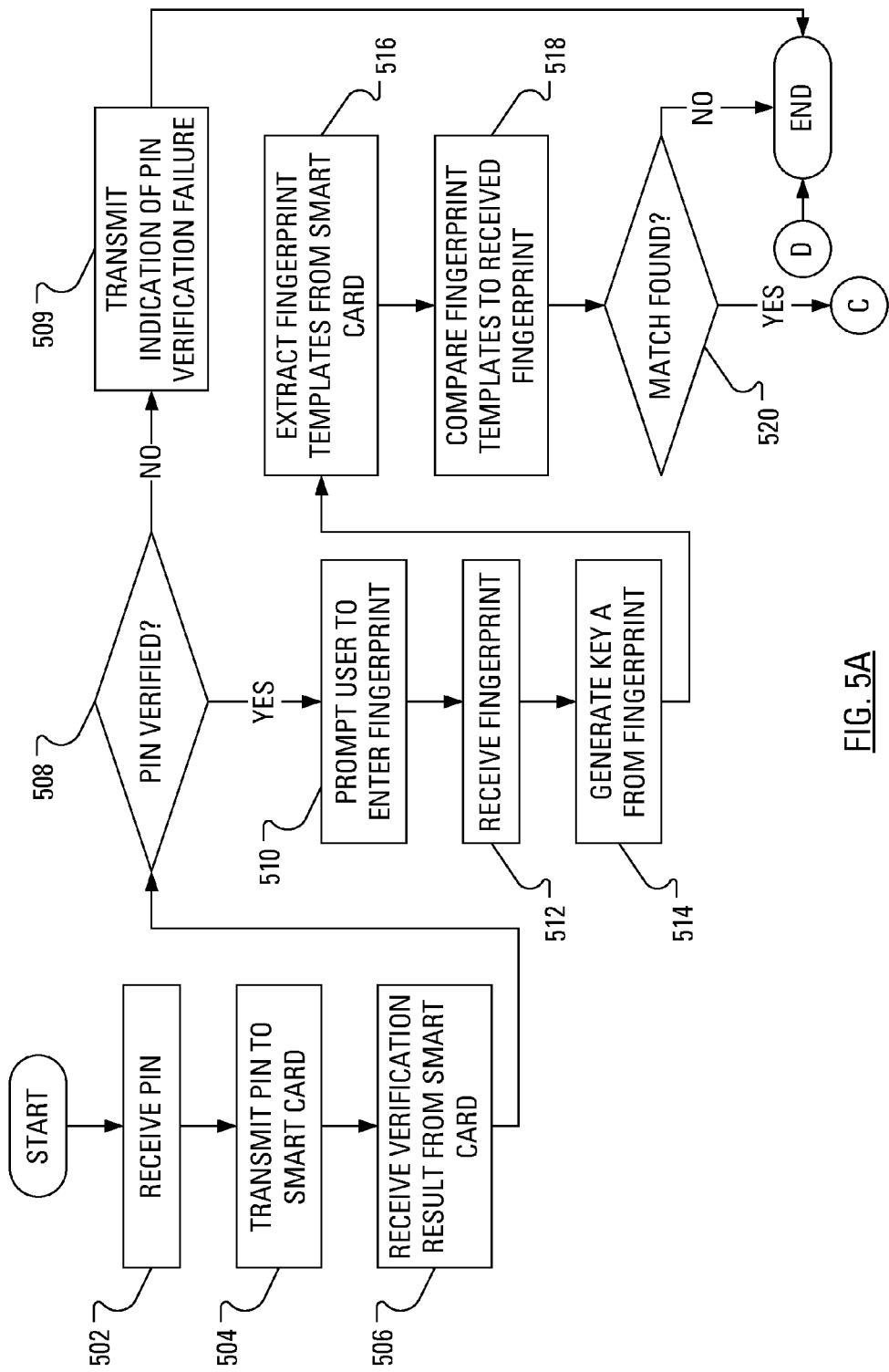
FIG. 5A illustrates example steps in a method carried out by the smart card reader of FIG. 1 in the enrollment phase.

The smart card reader 104 receives (step 502, FIG. 5A) the smart card PIN, for example, from the mobile communication device 106 or, for another example, directly from the fingerprint reader 325. Responsive to receiving the smart card PIN, the smart card reader 104 may transmit (step 504) the smart card PIN to the smart card 102 for verification and, subsequently, may receive (step 506) an indication of the verification result. Upon determining (step 508) that the smart card PIN has been successfully verified by the smart card 102, the smart card reader 104 prompts (step 510) the user to provide a biometric entry. The biometric entry may be provided by, for example, swiping a finger across the fingerprint reader 325. The smart card reader 104, upon receiving (step 512), in one embodiment, a fingerprint entered by the user, generates (step 514) a private key based on the user's fingerprint—this private key may be referred to as "key A".

Upon determining (step 508) that the smart card PIN has not been verified by the smart card 102, the smart card reader 104 may transmit (step 509) an indication of PIN verification failure to the mobile communication device 106. The smart card reader 104 may also directly indicate to the user PIN verification failure on the display module 312 of the smart card reader 104. Consequently, the enrollment procedure may be considered unsuccessful and complete. Alternatively, the user may be asked to re-enter the PIN to try again.

In addition to generating (step 514) a private key based on the user's fingerprint, the smart card reader 104 may also extract (step 516) the biometric fingerprint templates stored on the smart card 102 and compare (step 518) the fingerprint templates extracted from the smart card 102 to the user fingerprint received in step 512.

Alternatively, the smart card reader 104 may transmit the user fingerprint received in step 512 to the smart card 102 and it may be left to the smart card 102 to determine whether the user fingerprint is a match for one of the fingerprint templates stored on the smart card 102.

In either case, if the user fingerprint is determined (step 520) to be a match for one of the fingerprint templates, the enrollment procedure may continue. If the user fingerprint is determined (step 520) not to be a match for one of the fingerprint templates, the enrollment procedure may be considered unsuccessful and complete. Alternatively, the user may be asked to re-enter the fingerprint to try again.

Figure 5B:
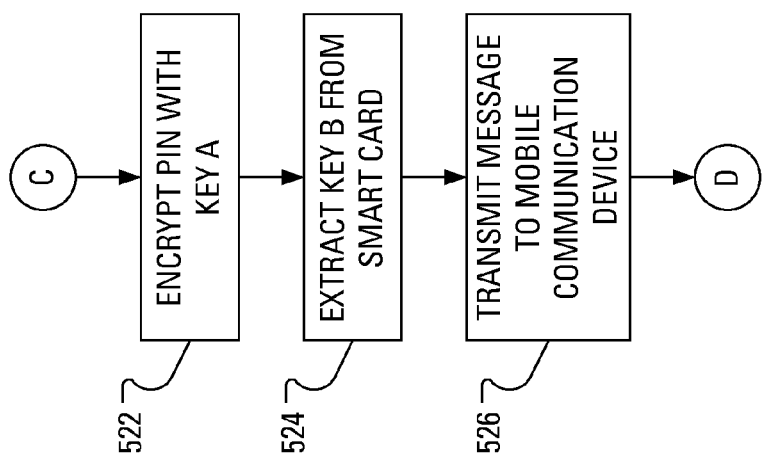
FIG. 5B illustrates further example steps in the method of FIG. 5A.

As the enrollment procedure continues, the smart card reader 104 encrypts (step 522, see FIG. 5B) the smart card PIN with key A. The smart card reader 104 may then extract (step 524) a public key from the smart card 102. The extracted public key corresponds to a private key on the smart card 102—this public key may be referred to as "key B". The smart card reader 104 may then transmit (step 526) a message to the mobile communication device 106, where the message indicates: that the smart card PIN has been verified; that the user fingerprint matches a stored fingerprint template on the smart card 102; and a value for key B.

Responsive to receiving (step 408, FIG. 4) the message, the mobile communication device 106 stores (step 410) key B. Upon storage (step 410) of key B, the user may consider that the combination of the smart card reader 104 and the mobile communication device 106 is configured for use of simplified multi-factor authentication.

A verification phase may be initiated responsive to any one of many distinct triggers. An example trigger is a user indicating, through the use of the mobile communication device 106 UI, a desire to unlock the mobile communication device 106 for use.

Figure 6:
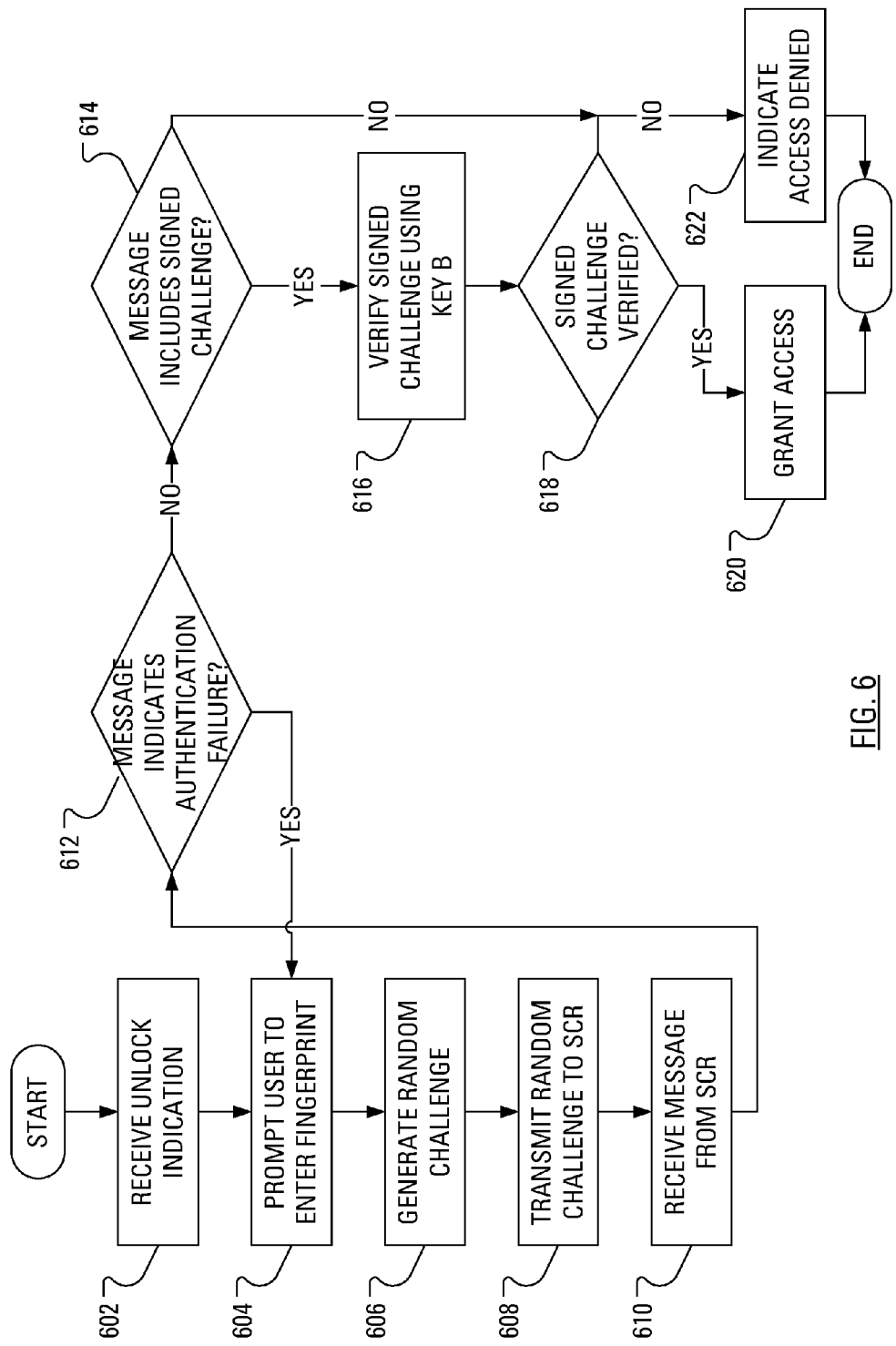
FIG. 6 illustrates example steps in a method carried out by the mobile communication device of FIG. 1 in a verification phase.

As the verification phase begins for example trigger, the mobile communication device 106 is in a locked state and the user interacts with a UI to indicate a desire to unlock the mobile communication device 106. Responsive to receiving (step 602, FIG. 6) the indication that the user wishes to unlock the mobile communication device 106, the authentication application executed by the microprocessor 228 on the mobile communication device 106 prompts (step 604) the user to provide a biometric entry, e.g., to enter a fingerprint, on the smart card reader 104. The authentication application then generates (step 606) a random challenge and transmits (step 608) the random challenge to the smart card reader 104.

Responsive to receiving (step 702) a fingerprint entered by the user at the fingerprint reader 325 of the smart card reader 104, and receiving (step 703) a random challenge from the mobile communication device 106, the smart card reader 104 generates (step 704) key A from the user-provided fingerprint. The smart card reader 104 decrypts (step 706) the smart card PIN using key A.

After decrypting (step 706) the smart card PIN, the smart card reader 104 determines (step 708) whether the decryption was successful by, for instance, transmitting the PIN to the smart card 102 and analyzing a response returned by the smart card 102. If the smart card reader 104 determines (step 708) that the PIN decryption was unsuccessful, the smart card reader 104 may transmit (step 710) an indication of PIN decryption failure to the mobile communication device 106. Responsive to receiving (step 610) a message from the smart card reader 104, the microprocessor 228 determines (step 610) whether the message indicates authentication failure. Upon determining (step 610) that the message indicates authentication failure, the authentication application may again prompt (step 604) the user to enter a fingerprint on the smart card reader 104. At the smart card reader 104, program control returns to step 702, wherein a user-provided fingerprint is again received.

If the smart card reader 104 determines (step 708) that the PIN decryption was successful, the smart card reader 104 may transmit (step 712) the smart card PIN to the smart card 102. Upon receiving (step 714) a verification indication from the smart card 102, the smart card reader 104 determines (step 716) whether the PIN verification was successful.

If the smart card reader 104 determines (step 716) that the PIN verification was unsuccessful, the smart card reader 104 may consider the verification phase as having failed or may transmit (step 718) an indication of PIN verification failure to the mobile communication device 106 and await a further fingerprint entry.

Responsive to receiving (step 610) a message from the smart card reader 104, the microprocessor 228 determines (step 612) whether the message indicates authentication failure. Upon determining (step 612) that the message indicates authentication failure, the authentication application may again prompt (step 604) the user to enter a fingerprint on the smart card reader 104. At the smart card reader 104, program control returns to step 702, wherein a user-provided fingerprint is again received.

If the smart card reader 104 determines (step 716) that the PIN verification was successful, the smart card reader 104 may extract (step 720) stored fingerprint templates from the smart card 102. Notably, access to the fingerprint templates stored on the smart card 102 is allowed only upon provision of a correct smart card PIN.

The smart card reader 104 may then compare (step 722) the fingerprint templates extracted from the smart card 102 to the user fingerprint received in step 702.

If the user fingerprint is determined (step 724) not to be a match for one of the fingerprint templates, the authentication is considered to be unsuccessful and complete. Since the PIN was entered correctly, a failure to match is unlikely. However, in such an unlikely event, it may be prudent to automatically "soft reset" the smart card 102 so that further access to the smart card 102 is not allowed. Otherwise, there is potential to expose private data.

If the user fingerprint is determined (step 724) to be a match for one of the fingerprint templates, the smart card reader 104 transmits (step 726) the random challenge, received from the mobile communication device 106 in step 703, to the smart card 102 along with a request to sign the random challenge.

Responsive to receiving the random challenge, the smart card 102 signs the random challenge, thereby generating a signed challenge, and provides the signed challenge to the smart card reader 104. The signing operation involves use of a private cryptographic key stored at the smart card 102. The private cryptographic key corresponds to the public cryptographic key, referred to herein as key B, extracted by the smart card reader 104 in step 524 (see FIG. 5B). Notably, access to the signing operation on the smart card 102 is allowed only upon provision of a correct smart card PIN, as performed in step 504.

Figure 7A:
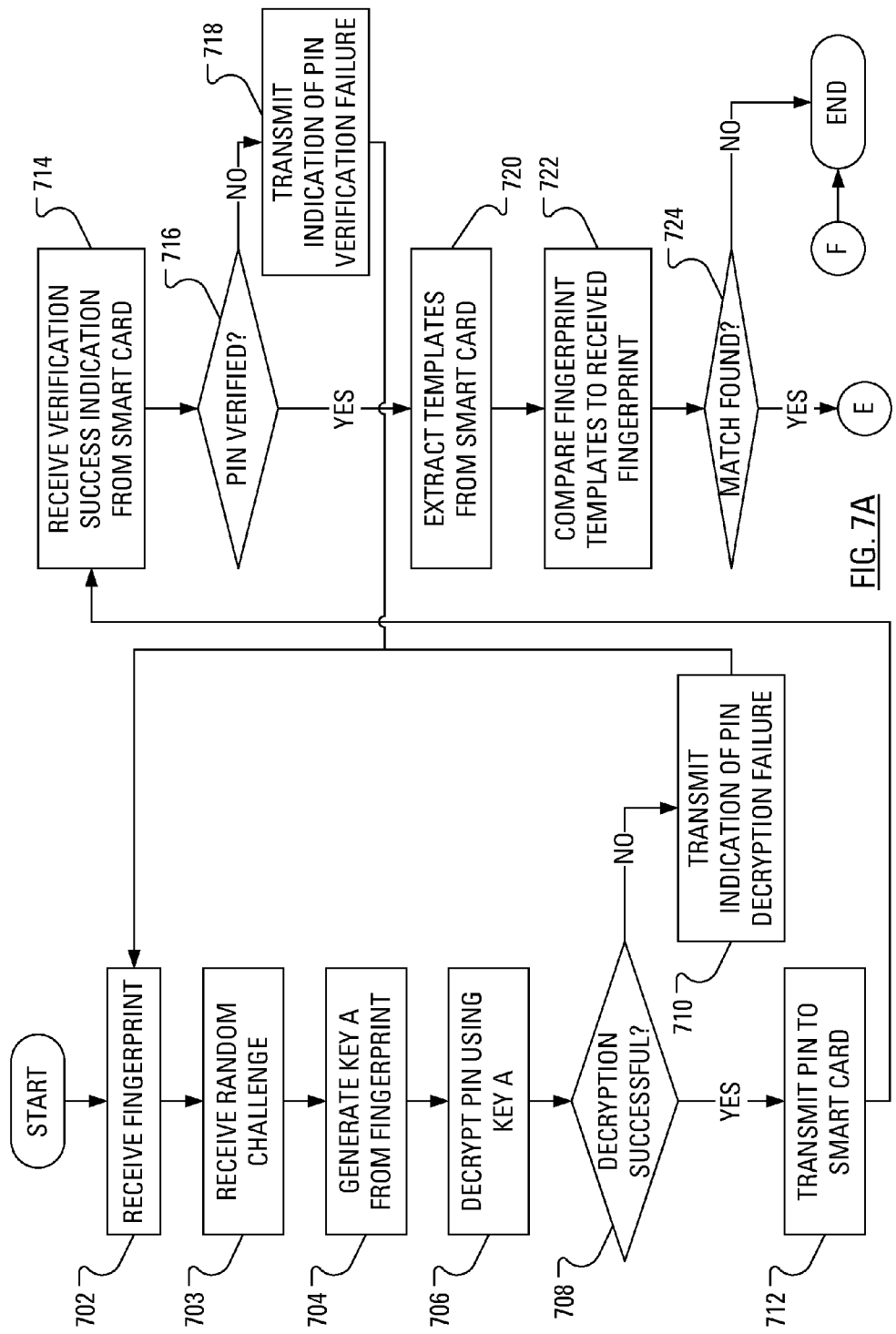
FIG. 7A illustrates example steps in a method carried out by the smart card reader of FIG. 1 in the verification phase.
Figure 7B:
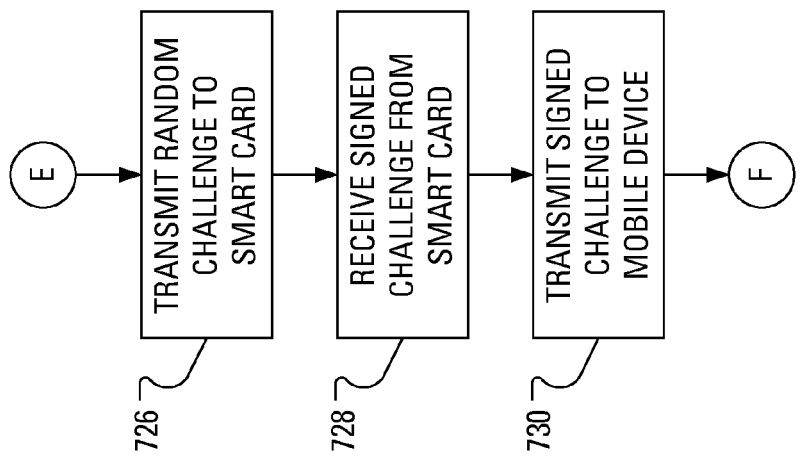
FIG. 7B illustrates further example steps in the method of FIG. 7A.

Upon receiving (step 728, see FIG. 7B) the signed challenge from the smart card 102, the smart card reader 104 transmits (step 730) a message to the mobile communication device 106, where the message includes the signed challenge. Upon transmitting (step 730) the signed-challenge message to the mobile communication device 106, the authentication is considered to be successful and complete.

Responsive to receiving (step 610) the signed-challenge message, determining (step 612) that the signed-challenge does not include an indication of authentication failure and determining (step 614) that the signed-challenge message includes the signed challenge, the microprocessor 228 of the mobile communication device 106 verifies (step 616) the signed challenge using key B. The microprocessor 228 then considers the outcome of the verification and determines (step 618) whether the verification was successful. Upon determining (step 618) that the verification was successful, the microprocessor 228 may grant (step 620) the user access to the mobile communication device 106.

Upon determining (step 618) that the verification was unsuccessful, the microprocessor 228 may indicate (step 622) that the user has been denied access to the mobile communication device 106. In either case, the verification phase may be considered to be complete.

Originally, for the example authentication scheme, the three factors included: "Something the user is", e.g., the user's fingerprint; "Something the user has", e.g., the smart card 102; and "Something the user knows", e.g., the PIN associated with the smart card 102. According to aspects of the present disclosure, through use of the enrollment phase, the user associates the "Something the user knows" factor with the "Something the user is" factor. Advantageously, in the verification phase, rather than three factors, the user may only supply two factors: the "Something the user is" factor, e.g., the user's fingerprint; and the "Something the user has" factor, e.g., the smart card 102.

While a fingerprint has been used as an example element of biometric data, other elements of biometric data may be used. Elements of biometric data include fingerprints, retinal scans, face geometry scans, hand geometry scans, voice or speech prints, etc.

The above-described embodiments of the present application are intended to be examples only. Alterations, modifications and variations may be effected to the particular embodiments by those skilled in the art without departing from the scope of the application, which is defined by the claims appended hereto.

What is claimed is:
1. A method of handling a factor of a multi-factor authentication sequence, said method comprising:

receiving a biometric candidate at a device associated with an identity verification element, said device lacking access to a biometric template until received from said identity verification element;

generating a cryptographic key from said biometric candidate;

decrypting a previously stored, encrypted character sequence associated with said identity verification element, wherein said decrypting employs said cryptographic key and results in a decrypted character sequence;

transmitting said decrypted character sequence to said identity verification element;

receiving, from said identity verification element, an indication of failed character sequence verification;

determining, from said indication, that said identity verification element has failed to verify said decrypted character sequence; and responsive to said determining, providing an indication of failure to verify.

2. The method of claim 1 wherein said biometric candidate comprises a candidate fingerprint.

3. The method of claim 1 wherein said identity verification element comprises a smart card.

4. The method of claim 3 wherein said encrypted character sequence comprises a personal identification number associated with said smart card.

5. The method of claim 1 wherein said providing said indication of failure to verify comprises communicating an indication of authentication failure to an associated device.

6. The method of claim 1 wherein said providing said indication of failure to verify comprises providing an indication of authentication failure directly on a display module.

7. A smart card reader comprising:

a storage component interface for receiving a smart card for communication therewith;

a memory for storing an encrypted character sequence associated with said smart card, said memory lacking access to a biometric template until received from said smart card;

a biometric input device; and a processor adapted to:
  receive a biometric candidate from said biometric input device;
  generate a cryptographic key from said biometric candidate;
  decrypt said encrypted character sequence, wherein said decrypting employs said cryptographic key and results in a decrypted character sequence;
  transmit said decrypted character sequence to said smart card;
  receive, from said smart card, an indication of failed character sequence verification;
  determine, from said indication, that said smart card has failed to verify said decrypted character sequence; and
  responsive to said determining, provide an indication of failure to verify.

8. The smart card reader of claim 7 wherein said biometric candidate comprises a candidate fingerprint.

9. The smart card reader of claim 7 wherein said encrypted character sequence comprises a personal identification number associated with said smart card.

10. The smart card reader of claim 7 wherein, to provide said indication of failure to verify, said processor is further adapted to communicate an indication of authentication failure to an associated device.

11. The smart card reader of claim 7 further comprising a display module and wherein, to provide said indication of failure to verify, said processor is further adapted to providing an indication of authentication failure directly on the display module.

12. A non-transitory computer readable medium containing computer-executable instructions that, when performed by a processor, cause said processor to:

receive a biometric candidate at a device associated with an identity verification element, said device lacking access to a biometric template until received from said identity verification element;

generate a cryptographic key from said biometric candidate;

decrypt a previously stored, encrypted character sequence associated with said identity verification element, wherein said decrypting employs said cryptographic key and results in a decrypted character sequence;

transmit said decrypted character sequence to said identity verification element;

receive, from said identity verification element, an indication of failed character sequence verification;

determine, from said indication, that said identity verification element has failed to verify said decrypted character sequence; and responsive to said determining, provide an indication of failure to verify.

13. The non-transitory computer readable medium of claim 12 wherein said biometric candidate comprises a candidate fingerprint.

14. The non-transitory computer readable medium of claim 12 wherein said identity verification element comprises a smart card.

15. The non-transitory computer readable medium of claim 14 wherein said encrypted character sequence comprises a personal identification number associated with said smart card.

16. The non-transitory computer readable medium of claim 12 wherein, to provide said indication of failure to verify, said instructions further cause said processor to communicate an indication of authentication failure to an associated device.

17. The non-transitory computer readable medium of claim 12 wherein, to provide said indication of failure to verify, said instructions further cause said processor to providing an indication of authentication failure directly on the display module.

* * * * *